(12) United States Patent
 Nakahara

(10) Patent No.: US 10,594,879 B2
(45) Date of Patent: Mar. 17, 2020

(54) INFORMATION PROCESSING APPARATUS, INFORMATION PROCESSING SYSTEM, METHOD FOR CONTROLLING INFORMATION PROCESSING SYSTEM, AND STORAGE MEDIUM

(71) Applicant: CANON KABUSHIKI KAISHA, Tokyo (JP)

(72) Inventor: Hidetaka Nakahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/104,521

(22) Filed: Aug. 17, 2018

(65) Prior Publication Data

US 2019/0007568 A1  Jan. 3, 2019

Related U.S. Application Data

(63) Continuation of application No. PCT/JP2017/005086, filed on Feb. 13, 2017.

(30) Foreign Application Priority Data

Feb. 19, 2016 (JP) ................................. 2016-029521

(51) Int. Cl.
 *G06F 3/12* (2006.01)
 *H04N 1/00* (2006.01)

(52) U.S. Cl.
 CPC ........... *H04N 1/00517* (2013.01); *G06F 3/12* (2013.01); *G06F 3/1204* (2013.01); *G06F 3/1257* (2013.01); *H04N 1/00* (2013.01); *H04N 1/00244* (2013.01); *H04N 1/00411* (2013.01); *H04N 1/00509* (2013.01); *H04N 2201/0094* (2013.01)

(58) Field of Classification Search
 None
 See application file for complete search history.

(56) References Cited

U.S. PATENT DOCUMENTS 6,771,385 B1 * 8/2004 Iizuka ................... G06F 3/1204
                                                    358/1.15
8,264,724 B2 * 9/2012 Matsuzawa ........ H04N 1/00222
                                                    358/1.15

(Continued)

FOREIGN PATENT DOCUMENTS

JP    2005-191686 A    7/2005
JP    2010-061501 A    3/2010

(Continued)

*Primary Examiner* — Dung D Tran
(74) *Attorney, Agent, or Firm* — Canon U.S.A., Inc., IP Division

(57) ABSTRACT

An information processing apparatus includes a storage unit that stores an operation pattern of at least one image forming apparatus and setting content set in the image forming apparatus which are associated with each other, an accumulation unit that accumulates history data indicating an operation history of the at least one image forming apparatus, and an output unit that outputs the setting content stored in the storage unit and associated with the operation pattern to the at least one image forming apparatus when history data corresponding to the operation pattern stored in the storage unit is detected in the history data accumulated in the accumulation unit.

9 Claims, 14 Drawing Sheets

(56) References Cited

U.S. PATENT DOCUMENTS

| | | | |
|---|---|---|---|
| 9,891,870 B2 * | 2/2018 | Nakamura | G06F 3/1212 |
| 2006/0126104 A1 | 6/2006 | Kumar | |
| 2008/0225032 A1 * | 9/2008 | Nishimi | H04N 1/00204 |
| | | | 345/211 |
| 2010/0290085 A1 * | 11/2010 | Okada | H04N 1/00222 |
| | | | 358/1.15 |
| 2011/0299106 A1 * | 12/2011 | Mori | G06F 3/1205 |
| | | | 358/1.9 |
| 2012/0200890 A1 * | 8/2012 | Okumura | G03G 15/5079 |
| | | | 358/1.15 |
| 2014/0036307 A1 * | 2/2014 | Kani | G06F 3/1204 |
| | | | 358/1.15 |
| 2015/0373216 A1 * | 12/2015 | Maeda | H04N 1/4406 |
| | | | 358/1.14 |

FOREIGN PATENT DOCUMENTS

| | | |
|---|---|---|
| JP | 2010-130507 A | 6/2010 |
| JP | 2011-130272 A | 6/2011 |
| JP | 2013-70294 A | 4/2013 |
| JP | 2015-150707 A | 8/2015 |
| JP | 2016-10005 A | 1/2016 |

* cited by examiner

FIG. 7

| TEMPLATE | | |
|---|---|---|
| TAG | ITEM | CONTENT |
| Kind | HISTORY TYPE | DESCRIBE AT LEAST ONE OF<br>- JOB HISTORY (PRINT, COPY, FAX, OR ALL)<br>- OPERATION HISTORY<br>- ERROR HISTORY |
| Timing | TIMING | DESCRIBE ONE OF<br>- WRITING OF HISTORY<br>- BATCH PROCESS |
| Pattern | PATTERN | DESCRIBE PATTERN TO BE EXTRACTED<br>PATTERN IS NOT DESCRIBED WHEN Action<br>FIELD CORRESPONDS TO HISTORY AGGREGATE |
| Action | ACTION | DESCRIBE ONE OF<br>- SETTING VALUE REFLECTION<br>(VALUES OF KEYS OF USER DB, DEVICE INDIVIDUAL, AND DEVICE COMMON)<br>- HISTORY AGGREGATE<br>(VALUES OF HISTORY AND LOCATIONS OF VALUES IN AGGREGATE DB) |

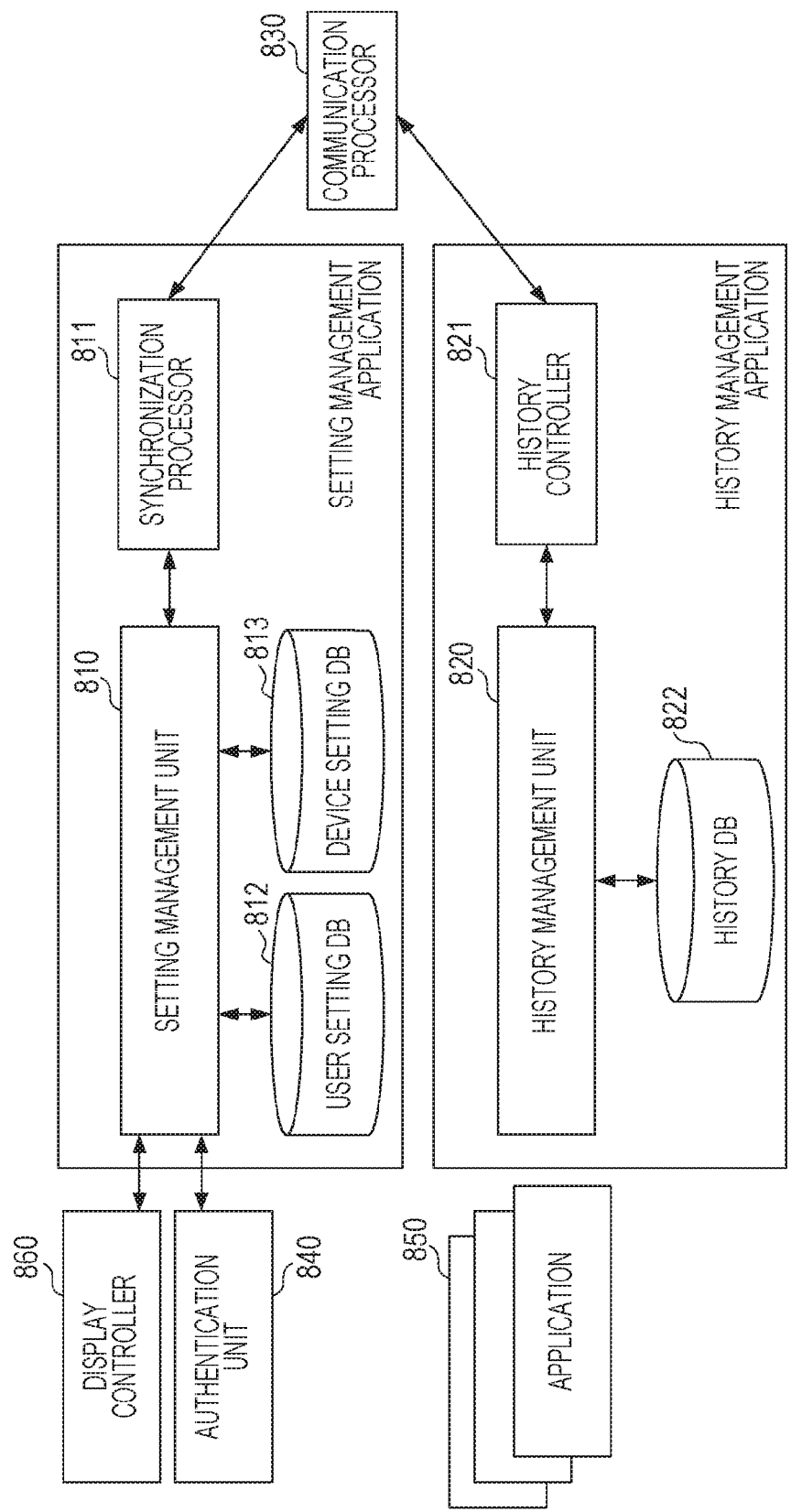

FIG. 9A
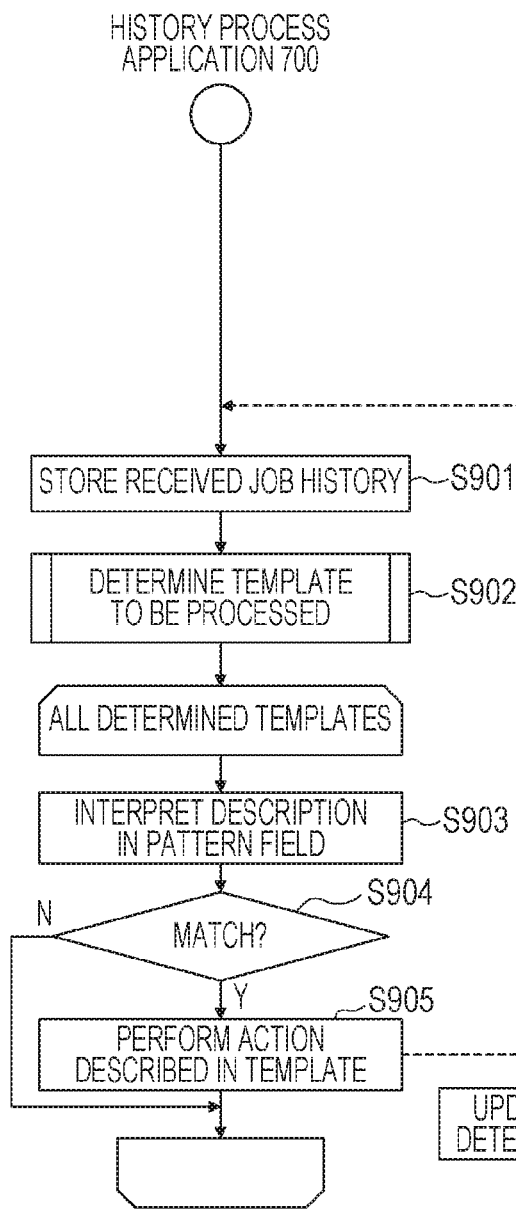
FIG. 9B
FIG. 9C
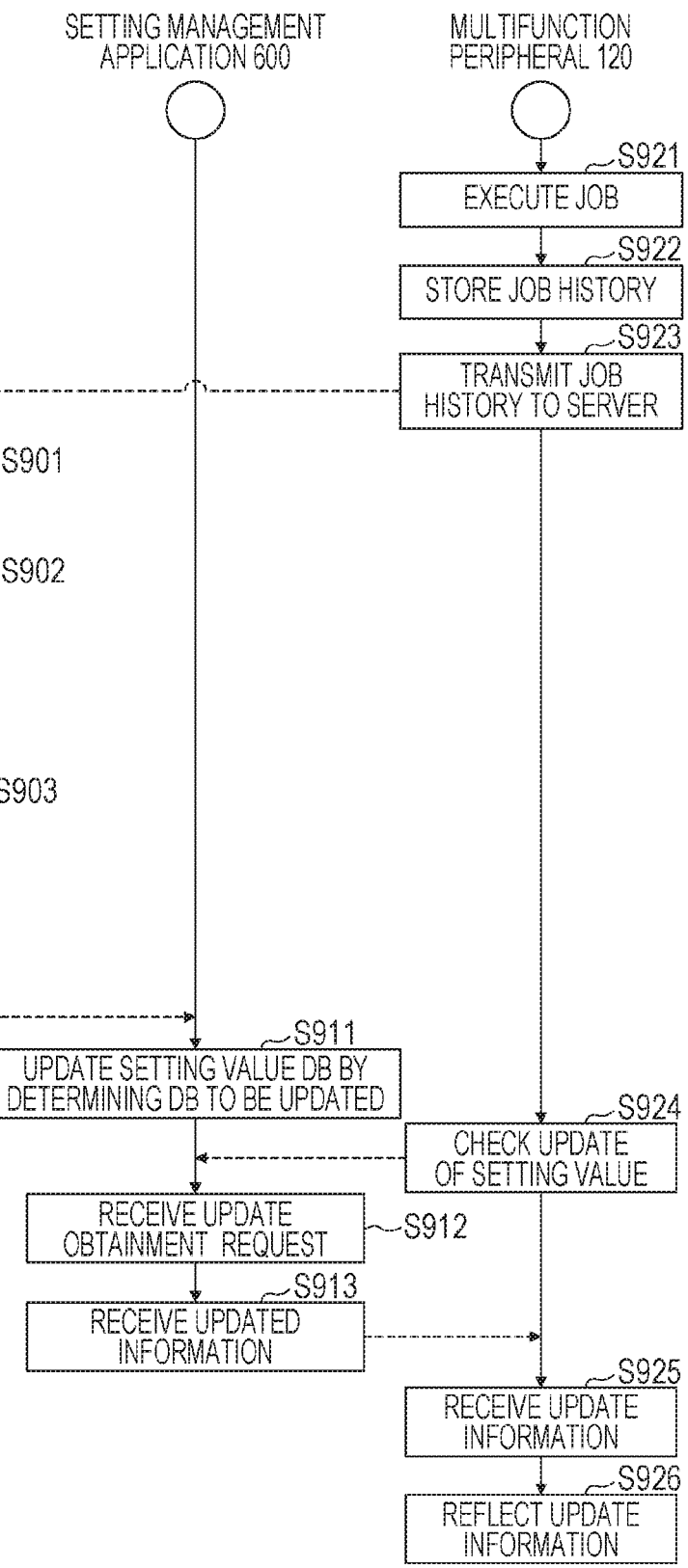

FIG. 10

```
"Kind" : ["Type" , "JobLog" , "AppType" , "StoredPrint" ],
"Timing" : "Every Write",
"Pattern" : [
    "FromDB" : "LogDB",
    "RecCondition" : [ "UserName" : "SAME", "FileName" : "SAME" , "Nup" : "NOT SAME" ],
    "RecInterval" : "<300",
    "Count" , ">5"
  ],
"Action" : ["Type" : "Settings Modify", "Data" : "UserDB" , "Key" : "print_settings.stored_print_preview", "Value" : "ON" ]
```

FIG. 11

```
"Kind" : ["Type" : "JobLog", "AppType" : "Print" ],
"Timing" : "Every Write",
"Pattern" : "",
"Action" : ["Type" : "Aggregate" , "FromColumn" : "Copies" , "ToColumn" : "AggregateDB.TotalCounter" ]
```

FIG. 12

```
"Kind" : ["Type" :"JobLog", "AppType" : "Print"],
"Timing" :"Bat",
"Pattern" : "",
"Action" : ["Type" : "Aggregate", "FromColumn" : "Copies", "ToColumn" : "AggregateDB.TotalCounter", "Condition" : "FromLastModify"]
```

FIG. 14A

| FILTER INFORMATION 001 |||
|---|---|---|
| HISTORY DATA TO BE REGISTERED IN HISTORY STORAGE DB 740 |||
| DATA ITEM | | CONTENT |
| TYPE | REGISTER | NOT SPECIFIED |
| TIME | REGISTER | NOT SPECIFIED |
| USER NAME | REGISTER | USER A |
| DEVICE NAME | NOT REGISTER | - |

ASSOCIATED TEMPLATE:
Template001, Template002

FIG. 14B

| | |
|---|---|
| TEMPLATE001 | ENABLE |
| TEMPLATE002 | DISABLE |
| TEMPLATE003 | DISABLE |
| TEMPLATE004 | DISABLE |

FIG. 14C

| | |
|---|---|
| FILTER INFORMATION001 | ENABLE |
| FILTER INFORMATION002 | DISABLE |
| FILTER INFORMATION003 | DISABLE |
| FILTER INFORMATION004 | DISABLE |

INFORMATION PROCESSING APPARATUS, INFORMATION PROCESSING SYSTEM, METHOD FOR CONTROLLING INFORMATION PROCESSING SYSTEM, AND STORAGE MEDIUM

CROSS-REFERENCE TO RELATED APPLICATIONS

This application is a Continuation of International Patent Application No. PCT/JP2017/005086, filed Feb. 13, 2017, which claims the benefit of Japanese Patent Application No. 2016-029521 filed Feb. 19, 2016, both of which are hereby incorporated by reference herein in their entirety.

TECHNICAL FIELD

The present invention relates to a technique of performing settings of an information processing apparatus based on operation history of the information processing apparatus.

BACKGROUND ART

In general, a technique of reproducing settings used by a user in the past has been used. A printing system disclosed in PTL 1 stores a print setting history and a print job of a multifunction peripheral which are associated with each other. Then a print setting suitable for a print job newly input is displayed for the user based on a type of the print job newly input and a past setting history.

In the printing system disclosed in PTL 1, a print setting which is most frequently used in print settings when print jobs of the same type as the print job newly input are executed in the past is recommended as a print setting for executing the print job newly input.

In the printing system disclosed in PTL 2, delivery setting information, such as an address, used to transmit documents and images from a multifunction peripheral to an external apparatus is associated with identification information of a user and managed in a server. When successfully performing user authentication, the multifunction peripheral transmits identification information of an authenticated user to the server. The server determines a delivery setting to be transmitted to the multifunction peripheral based on the delivery setting information associated with the identification information of the user transmitted from the multifunction peripheral. The multifunction peripheral obtains the delivery setting determined by the server and performs transmission of an email and the like using the obtained delivery setting.

CITATION LIST

Patent Literature

PTL 1 Japanese Patent Laid-Open No. 2015-150707
PTL 2 Japanese Patent Laid-Open No. 2011-130272

The general systems may only reproduce the same settings performed in the past on the same multifunction peripheral. Therefore, even if the user desires to perform settings for usages of the multifunction peripheral which are more suitable for the user than settings performed on the multifunction peripheral in the past, the general systems may only display the settings performed on the multifunction peripheral in the past for the user.

It is assumed here that a first setting in which a confirmation screen which prompts the user to confirm whether a print setting (such as a color print setting or a monochrome print setting) is desirable is displayed every time the user issues a print instruction and a second setting in which the confirmation screen is not displayed are settable in the multifunction peripheral.

In a case where the user has a strong predilection to issue a print instruction without confirming a print setting, realize that the print setting is not desirable after a print process, and print the same print data again, undesired printing may be reduced when the first setting is employed.

However, in the general systems, if only the second setting was applied to the multifunction peripheral in the past, suggestion for employing the first setting may not be performed in the multifunction peripheral.

It is further assumed that a first processing speed and a second processing speed which is higher than the first processing speed are settable as print speeds (the number of copies per hour, for example) in the multifunction peripheral. Furthermore, it is assumed that, if the first processing speed is set, consumption power and wear of the multifunction peripheral may be reduced when compared with the second processing speed.

If it is highly likely that an amount of print processing of the multifunction peripheral is increased in a particular term, the second print speed is set in the multifunction peripheral in the particular term so that print jobs are prevented from being stuck in the multifunction peripheral. On the other hand, the first print speed is set in the multifunction peripheral in a term other than the particular term so that power consumption and wear of the multifunction peripheral are reduced.

However, in the general systems, if only the first print speed was applied to the multifunction peripheral in the past, suggestion for employing the second print speed in the particular term may not be performed.

SUMMARY OF INVENTION

An information processing apparatus according to the present invention has the following configuration. Specifically, information processing apparatus comprises a storage device that stores an operation pattern of an image forming apparatus and setting content set in the image forming apparatus which are associated with each other; at least one memory device that stores a set of instructions; and at least one processor that executes the instructions to: accumulate history data indicating an operation history of the image forming apparatus; and output, to the image forming apparatus, the setting content stored in the storage device and associated with the operation pattern, when history data corresponding to the stored operation pattern is detected in the accumulated history data.

Further features of the present invention will become apparent from the following description of exemplary embodiments with reference to the attached drawings.

BRIEF DESCRIPTION OF DRAWINGS

FIG. 7 is a diagram illustrating a format of a template.

FIG. 8 is a diagram illustrating a software configuration of the multifunction peripheral 120.

FIGS. 9A to 9C are a sequence diagram illustrating operation of the system according to the first embodiment.

FIG. 10 is a diagram illustrating an example of description of a template.

FIG. 11 is a diagram illustrating an example of description of a template.

FIG. 12 is a diagram illustrating an example of description of a template.

FIGS. 14A to 14C are diagrams illustrating an example of filter information and an example of a management mode of validation and invalidation of the filter information.

DESCRIPTION OF EMBODIMENTS

Hereinafter, embodiments of the present invention will be described with reference to the accompanying drawings.

First Embodiment

Figure 1:
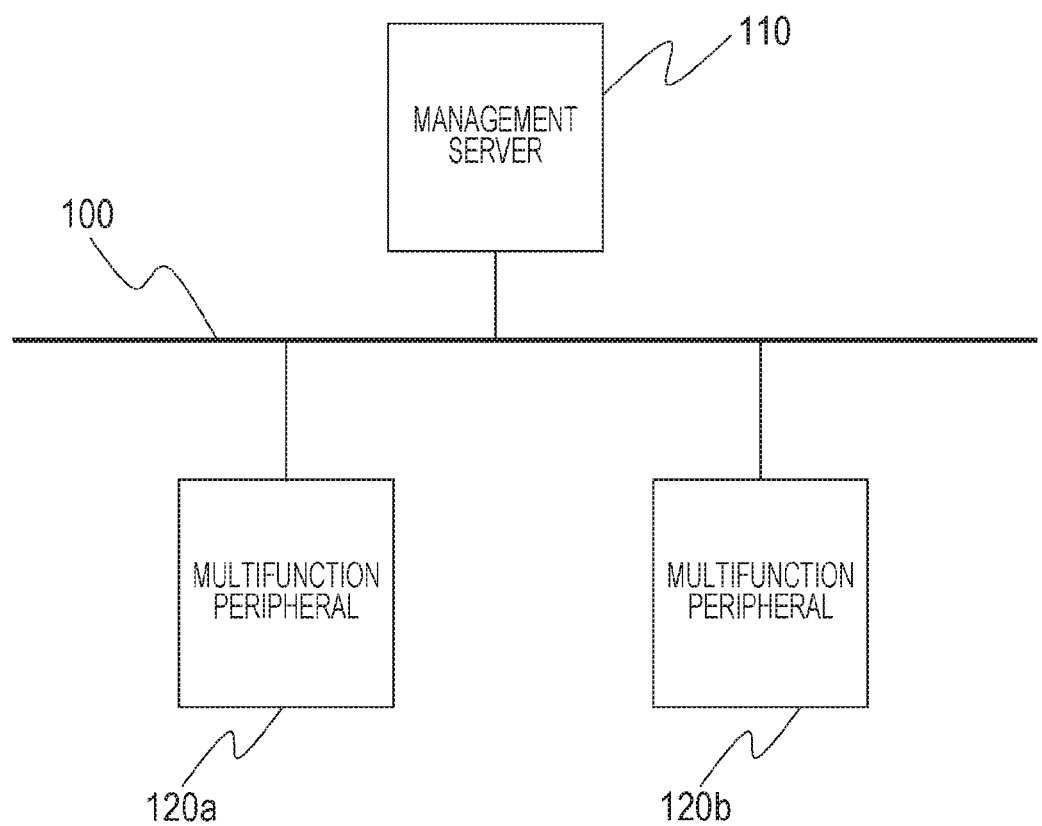
FIG. 1 is a diagram illustrating a configuration of a system according to a first embodiment.

A configuration of an information processing system according to this embodiment will be described with reference to FIG. 1. In an example of FIG. 1, a management server 110 and multifunction peripherals 120a and 120b are connected to a network 100. Hereinafter, the multifunction peripherals 120a and 120b are collectively referred to as a multifunction peripheral 120 where appropriate. The network 100 may be a wired network or a wireless network. Furthermore, any type of communication line and any type of communication protocol may be used in communication.

The multifunction peripheral 120 is an image forming apparatus having a print function, a copy function, a scan function, and a FAX function. The multifunction peripheral 120 is not required to have all the functions. The multifunction peripheral 120 may be an image forming apparatus having a single function, such as the print function or the copy function The management server 110 is an information processing apparatus which manages setting information of the multifunction peripheral 120 serving as a client. In this embodiment, the management server 110 has two application functions. One of the functions corresponds to an analysis application 700 which collects and analyzes history information of jobs executed by the multifunction peripheral 120 and history information of user operations. The other of the functions corresponds to a setting management application 600 which manages a setting value group (setting information) to be used by the multifunction peripheral 120 and reflects update in the multifunction peripheral 120 if the setting values are updated.

In this embodiment, the setting management application 600 and the analysis application 700 are stored in storage means, such as a random access memory (RAM) 203, a hard disk drive (HDD) 204, or a read only memory (ROM) 202 and are executed by a central processing unit (CPU) 201.

Although the case where the two applications are installed in the same management server 110 is described as an example in this embodiment, the two applications may be operated in different servers as long as the applications are communicated with each other. Alternatively, the analysis application 700 and the setting management application 600 may be configured as a single application. Content of processes executed by the setting management application 600 and the analysis application 700 will be described hereinafter with reference to FIGS. 9A to 9C.

Figure 2:
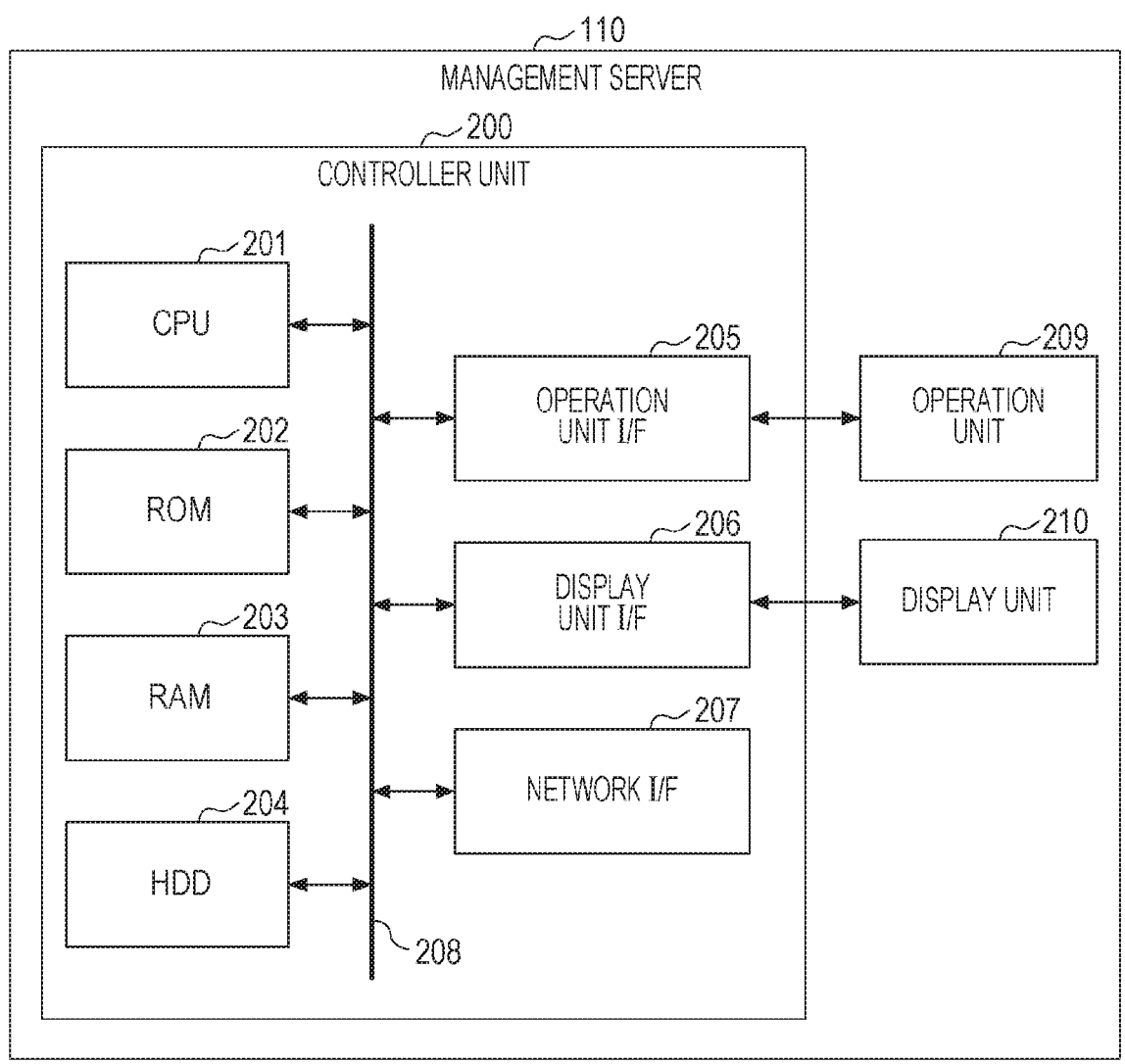
FIG. 2 is a block diagram illustrating a configuration of a management server 110.

Next, a configuration of the management server 110 according to this embodiment will be described with reference to FIG. 2. The management server 110 may be a personal computer (PC) including a computer and a display or a multifunction peripheral which is similar to the multifunction peripheral 120. The management server 110 includes a controller unit 200, an operation unit 220, and a display unit 210.

The controller unit 200 includes the CPU 201, for example. The CPU 201 executes a boot program stored in the ROM 202 so as to activate an operating system (OS).

The CPU 201 executes application programs stored in the HDD 204 so as to execute various processes. The ROM 202 is used as a work area of the CPU 201.

The HDD 204 stores a program used to realize the setting management application 600, a program used to realize the analysis application 700, master data, and the like. In this embodiment, examples of the master data include a specification database (DB) 510, a display resource DB 511, a registration device management DB 512, a configuration information DB 513, an individual setting DB 520, a common setting DB 521, and a user setting DB 530 described below.

The CPU 201 is connected to the ROM 202, the RAM 203, an operation unit interface (I/F) 205, a display unit I/F 206, and a network I/F 207 through a system bus 208.

The operation unit I/F 205 receives a signal input from an operation unit 209, such as a mouse or a keyboard, and transmits information input by the user using the operation unit 209 to the CPU 201. The display unit I/F 206 outputs image data to be displayed in the display unit 210, such as a display, to the display unit 210. Furthermore, the network I/F 207 is connected to the network 100 and performs input and output of information with various apparatuses on the network 100 through the network 100.

Figure 3:
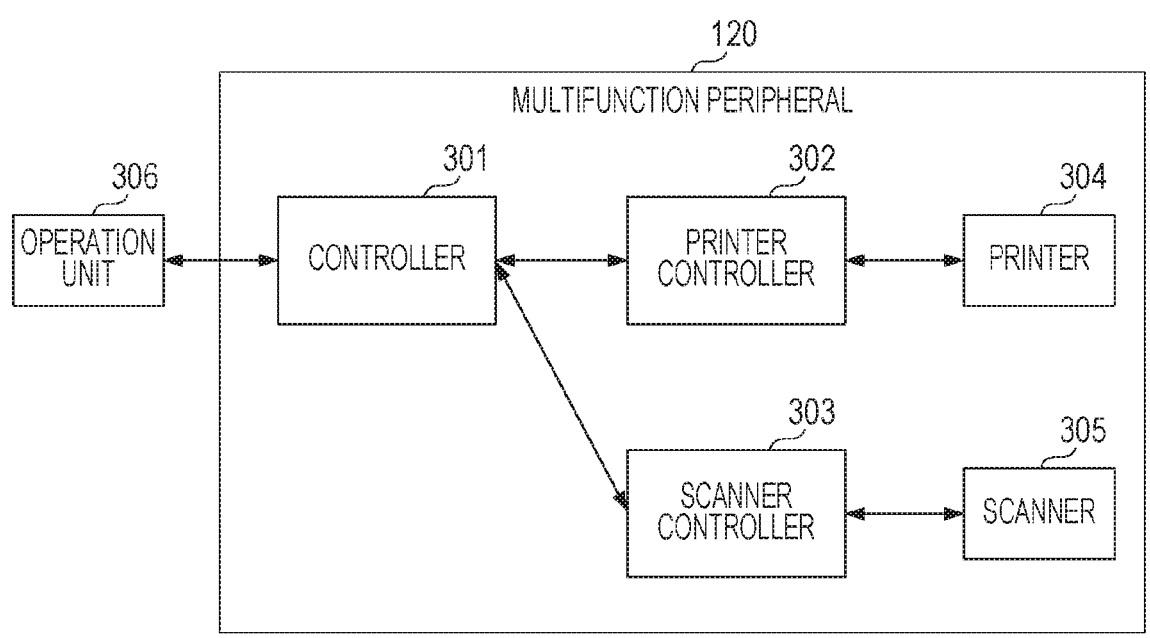
FIG. 3 is a block diagram illustrating a configuration of a multifunction peripheral 120.

Next, a configuration of the multifunction peripheral 120 according to this embodiment will be described with reference to FIG. 3. The multifunction peripheral 120 includes a controller 301, a printer controller 302, a scanner controller 303, a printer 304, a scanner 305, and an operation unit 306. The controller 301 integrally controls information processing associated with operation of the multifunction peripheral 120. The controller 301 is connected to the operation unit 306, the printer controller 302, and the scanner controller 303.

The printer controller 302 controls operation of the printer 304 serving as an image output device. The scanner controller 303 controls operation of the scanner 305 serving as an image input device.

Figure 4:
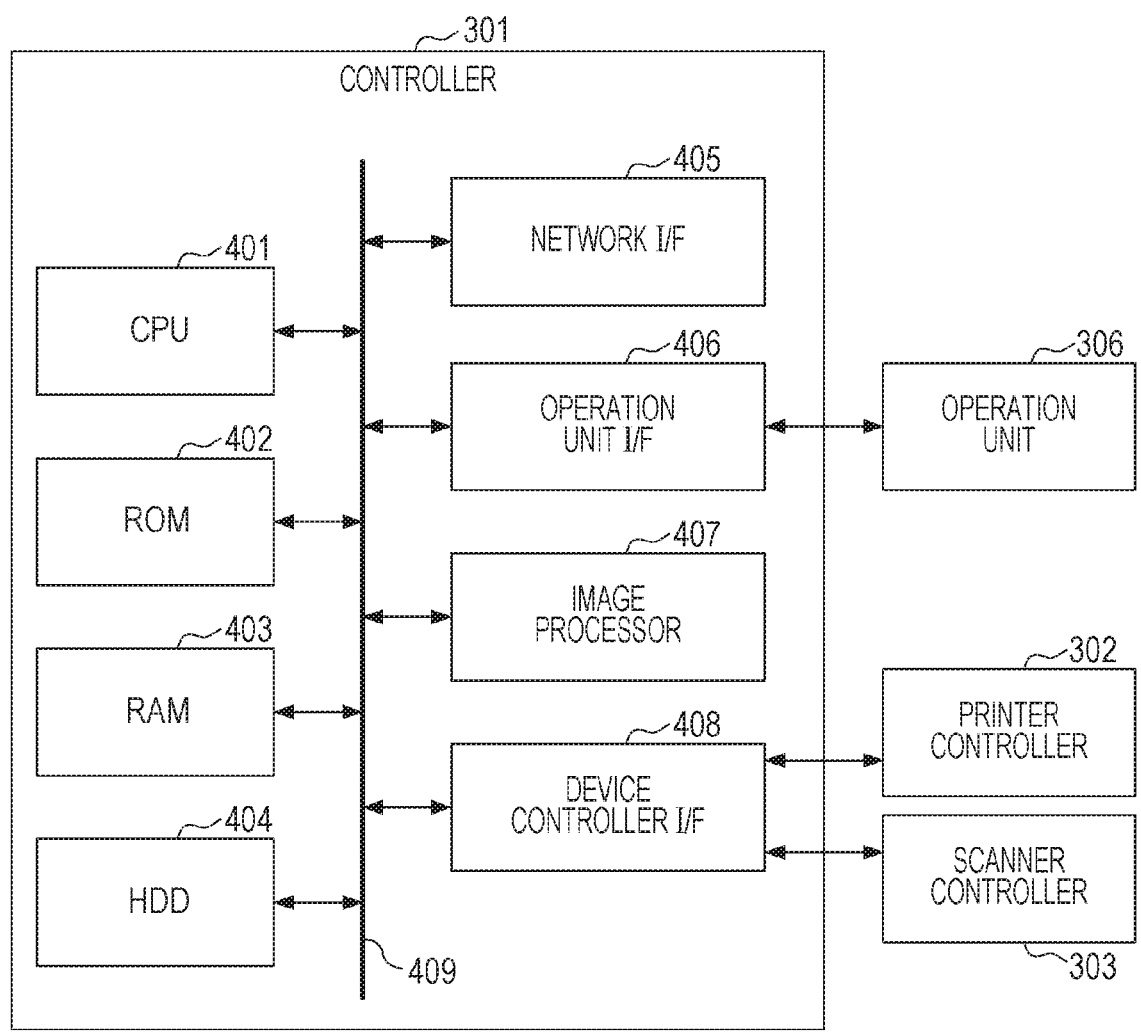
FIG. 4 is a block diagram illustrating a configuration of a controller 301 of the multifunction peripheral 120.

Next, a configuration of the controller 301 included in the multifunction peripheral 120 will be described with reference to FIG. 4. The controller 301 includes a CPU 401, for example, which executes a boot program stored in a ROM 402 so as to activate an OS.

The CPU 401 executes application programs stored in an HDD 404 on the OS so as to execute various processes. A RAM 403 is used as a work area of the CPU 401.

The RAM 403 is provided with the work area and an image memory region for temporarily storing image data.

The HDD 404 stores programs used to realize applications, image data, various setting values, and the like.

The CPU 401 is connected to the ROM 402, the RAM 403, an operation unit I/F 406, a device controller 408, a network I/F 405, an image processor 407, and the HDD 404 through a system bus 409.

The operation unit I/F 406 is connected to the operation unit 306 and outputs image data to be displayed in the operation unit 306 to the operation unit 306. The operation unit 306 includes a touch panel, for example. Alternatively, the operation unit 306 may include physical buttons and the like.

The operation unit I/F 406 transmits information input by the user through the operation unit 306 to the CPU 401. The device controller I/F 408 is connected to the printer controller 302 and the scanner controller 303.

The network I/F 405 is connected to the network 100 and performs input and output of information with various apparatuses on the network 100 through the network 100. The image processor 407 performs processing on an image output to the printer 304 and an image input from the scanner 305, image rotation, image compression, resolution conversion, color space conversion, gradation conversion, and the like.

Figure 5:
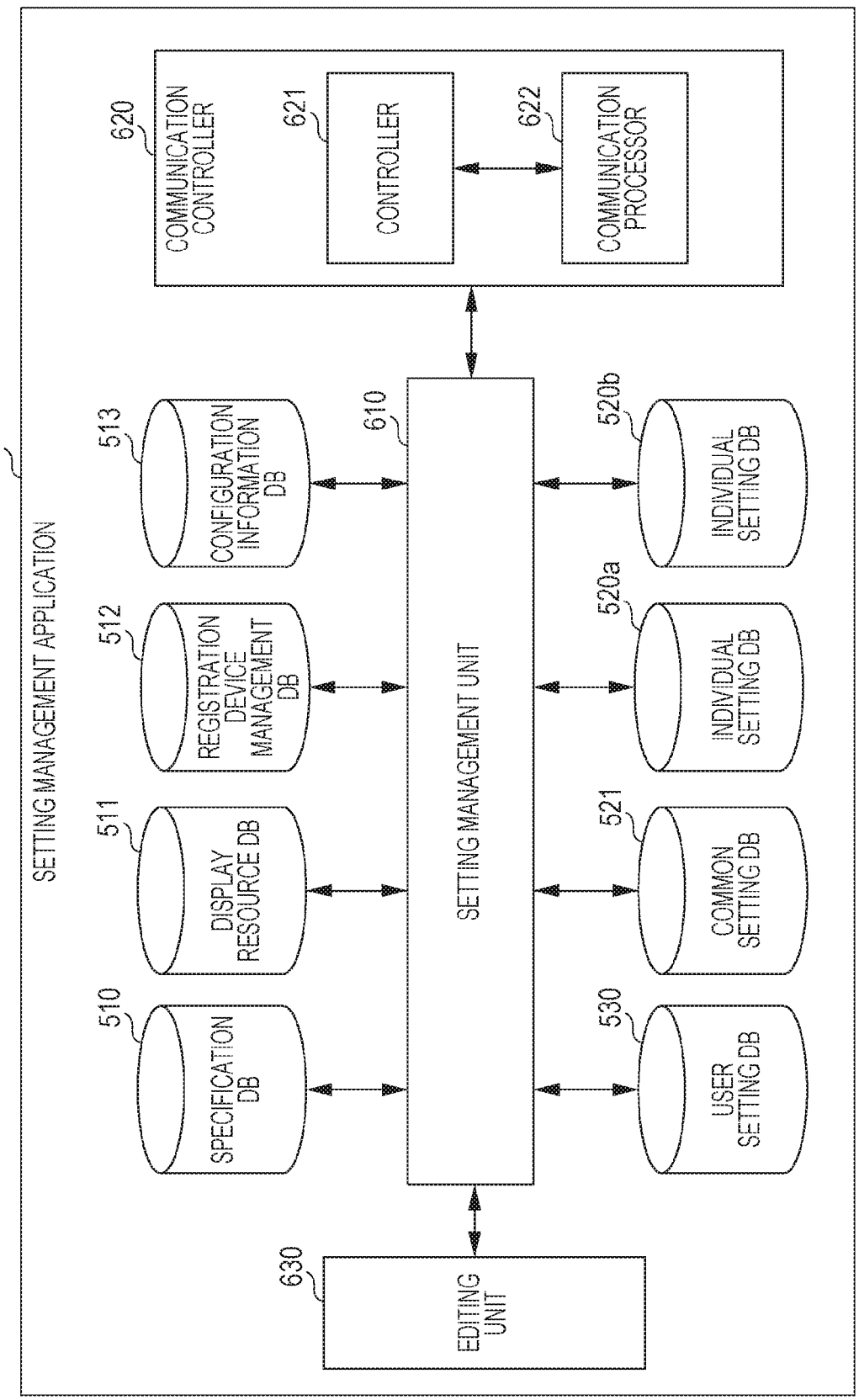
FIG. 5 is a diagram illustrating a software configuration of a setting management application 600.

Next, a configuration of the master data managed by the management server 110 will be described with reference to FIG. 5. The master data is managed by the setting management application 600 described above.

In this embodiment, the master data includes a plurality of databases. In this embodiment, as the databases included in the master data, the specification DB 510, the display resource DB 511, the registration device management DB 512, the configuration information DB 513, the individual setting DB 520, the common setting DB 521, and the user setting DB 530 are stored.

The specification DB 510 manages specification information including a range (a range of a value) of a setting value settable in the multifunction peripheral 120. For example, a range in which a setting value is settable varies depending on presence or absence of an option apparatus of the multifunction peripheral 120 or a firmware version, for example. Therefore, the setting value settable range (the specification information) is managed for each multifunction peripheral 120. Alternatively, the specification information may be managed for each option apparatus or each firmware version.

The display resource DB 511 manages image data, the specification information, and the setting value which are required for displaying an editing screen used by the user for editing setting data.

The registration device management DB 512 manages identification information for identifying the multifunction peripheral 120 to be managed by the management server 110.

The configuration information DB 513 manages a hardware configuration of the multifunction peripherals 120 managed by the management server 110 and configuration information indicating the firmware version. Examples of the configuration information include information indicating the option apparatus connected to the multifunction peripheral 120a and option parts. Furthermore, the configuration information DB 513 stores license information included in the multifunction peripheral 120.

The individual setting DB 520 manages a unique setting value or the like for each multifunction peripheral 120. For example, if a setting of a display layout of an operation screen displayed in a display panel of the multifunction peripheral 120a is different from a setting of a display layout of an operation screen displayed in an operation panel of the multifunction peripheral 120b, the settings are managed while being associated with the identification information of the corresponding multifunction peripherals 120. Furthermore, the common setting DB 521 manages a setting value which is common among the plurality of multifunction peripherals 120.

The user setting DB 530 manages a setting value which is unique to a user of the multifunction peripheral 120. For example, the user setting DB 530 manages a setting of the display layout of the operation screen displayed in the display panel when a user A logs in the multifunction peripheral 120a so as to operate the multifunction peripheral 120a. For example, the user setting DB 530 manages a setting of the display layout of the operation screen to be displayed in the display panel when a user B logs in the multifunction peripheral 120a so as to operate the multifunction peripheral 120a.

The information stored in the registration device management DB 512 and the configuration information DB 513 is used by a setting management unit 610 described below to manage display/non-display of the setting information included in the master data. Furthermore, the information stored in the registration device management DB 512 and the configuration information DB 513 is referred to so that editing on the setting information included in the master data is restricted.

Next, a software configuration of the setting management application 600 used by the management server 110 to manage the master data will be described with reference to FIG. 5. The setting management application 600 performs control such that content of a DB stored in the management server 110 is the same as content of a DB stored in the multifunction peripheral 120. Hereinafter, the process described above to be performed to make the content of the DB stored in the management server 110 and the content of the DB stored in the multifunction peripheral 120 the same is collectively referred to as a synchronization process where appropriate. Note that update information which is a target to be synchronized is not limited to update content of setting values of existing setting items and includes setting values of setting items which are newly stored in the management server 110 or the multifunction peripheral 120 and the like.

The setting management application 600 stored in the HDD 204 of the management server 110 is developed in the RAM 203 and executed by the CPU 201 so that a function of the setting management application 600 is realized.

The setting management unit 610 manages the master data of the setting information of at least one multifunction peripheral 120 connected to the management server 110. The setting management unit 610 manages reading and writing of the individual setting DB 520, the common setting DB 521, and the user setting DB 530 described above in the master data stored in the management server 110. When a communication controller 620 described below receives the update information of the setting value from the multifunction peripheral 120, the setting management unit 610 updates the common setting DB 521, the individual setting DB 520, and the user setting DB 530 based on the received update information. Furthermore, when the communication controller 620 receives a request for obtaining the update information of the setting value from the multifunction peripheral 120, the setting management unit 610 generates update information to be transmitted to the multifunction peripheral 120 and transmits the update information to the communication controller 620.

The communication controller 620 controls communication through the network I/F 207. When the setting information of the multifunction peripheral 120 is updated, the communication controller 620 receives the update information indicating content of the update from the multifunction peripheral 120. Furthermore, the communication controller 620 receives a request for obtaining the update information indicating the content of the update of the master data from the multifunction peripheral 120. Moreover, the communication controller 620 transmits the update information indicating the content of the update of the master data to the multifunction peripheral 120 which has transmitted the obtainment request in response to the obtainment request.

The communication controller 620 includes a controller 621 which controls the synchronization process of the setting value with the multifunction peripheral 120, and a communication processor 622.

When the communication processor 622 receives the update information of the setting value from the multifunction peripheral 120, the controller 621 notifies the setting management unit 610 of the update information. The setting management unit 610 updates the master data using the notified update information.

Furthermore, when the communication processor 622 receives a request for obtaining the update information from the multifunction peripheral 120, the controller 621 obtains the update information of the multifunction peripheral 120 from the setting management unit 610 and instructs the communication processor 622 to transmit the update information to the multifunction peripheral 120. The communication processor 622 executes a process of communication with the multifunction peripheral 120 described above.

Furthermore, an editing unit 630 receives an instruction input to the management server 110 through a web browser of a PC or a tablet. The editing unit 630 displays the setting information managed by the setting management unit 610 in a web browser UI of a PC or a tablet in accordance with the received instruction and performs editing of the setting information.

The editing unit 630 uses the information stored in the specification DB 510 and the display resource DB 511 to display an editing screen in the browser UI. The editing unit 630 may read and write values of the DBs included in the master data through the setting management unit 610 in accordance with an instruction issued through the browser UI.

Figure 6:
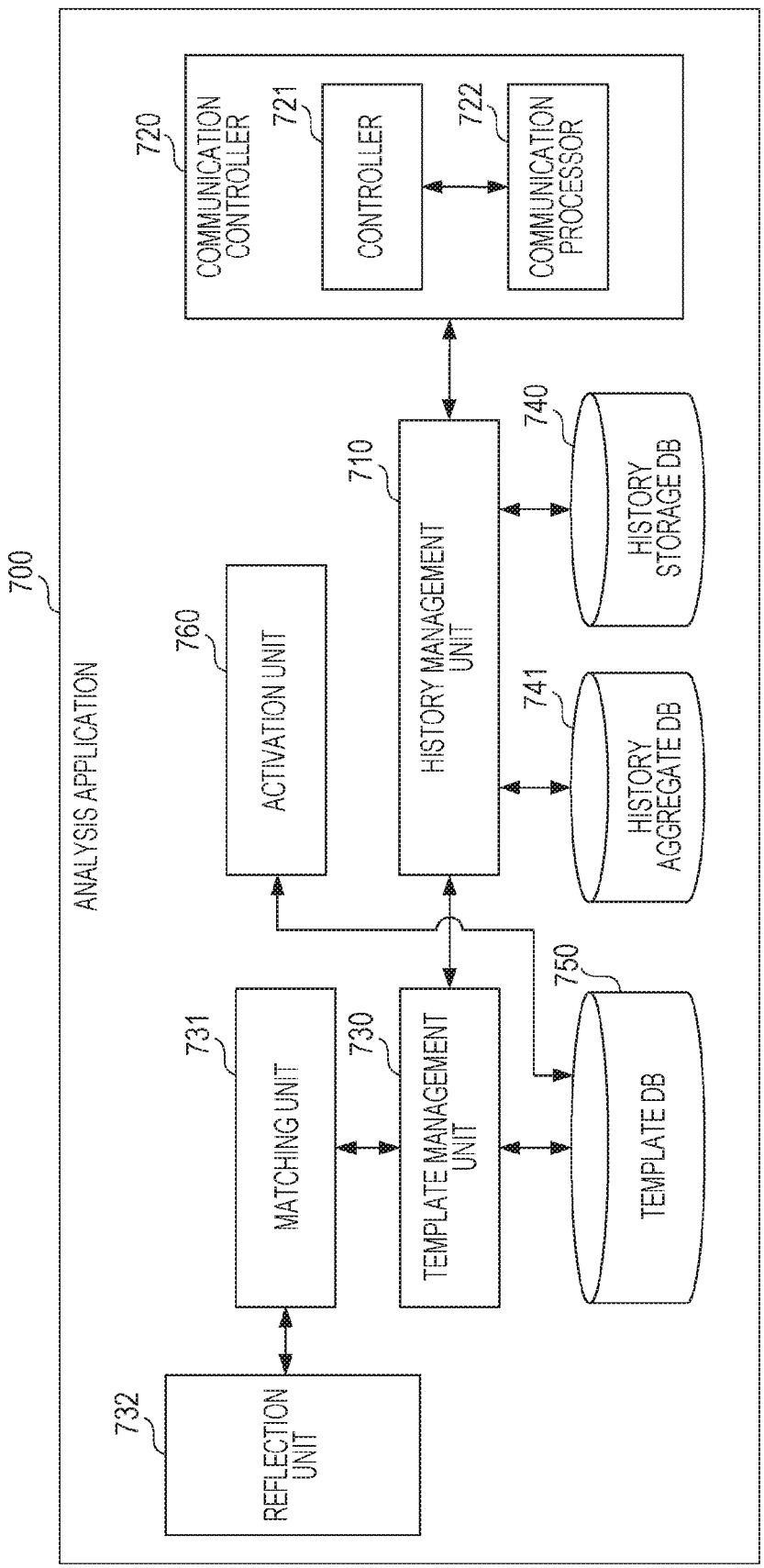
FIG. 6 is a diagram illustrating a software configuration of an analysis application 700.

Next, a software configuration of the analysis application 700 used to execute a predetermined process using history information obtained by the management server 110 from the multifunction peripheral 120 will be described with reference to FIG. 6. The analysis application 700 stored in the HDD 204 of the management server 110 is developed in the RAM 203 and executed by the CPU 201 so that a function of the analysis application 700 is realized.

The analysis application 700 includes a history management unit 710, a communication controller 720, a template management unit 730, a matching unit 731, and a reflection unit 732.

The history management unit 710 performs reading and writing of history data on a history storage DB 740 and a history aggregate DB 741. The history data is transmitted from the multifunction peripheral 120 to the management server 110 and is information indicating an operation history (a processing execution history, for example) of the multifunction peripheral 120. The history data includes a job execution history (including a print job, a copy job, and a FAX job), an operation history indicating content of an operation performed by the user on the multifunction peripheral 120, and an error history indicating content of an error which has occurred in the multifunction peripheral 120.

The history storage DB 740 stores history data obtained from at least one of the multifunction peripherals 120. In this embodiment, the history storage DB 740 manages the history data while associating the history data with identification information of the multifunction peripheral 120 which has transmitted the history data.

The history aggregate DB 741 records aggregate information associated with the history data obtained from the multifunction peripheral 120. The aggregate information includes a total value of the number of copies in the multifunction peripheral 120.

The template management unit 730 manages a template DB 750. The template DB 750 stores template information (hereinafter referred to as a template) to be used by the matching unit 731 described below to analyze the history data. The template will be described in detail hereinafter with reference to FIGS. 8, 10, 11, and 12.

The matching unit 731 analyzes the history data stored in the history storage DB 740 and the history data stored in the history aggregate DB 741. The matching unit 731 performs a matching process by comparing the history data stored in the history storage DB 740 or the history aggregate DB 741 with a description of the template. The matching unit 731 determines a template to be used based on the history data received from the multifunction peripheral 120. The matching unit 731 determines whether the history data stored in the history storage DB 740 or the history aggregate DB 741 matches a predetermined operation pattern described in the selected template.

The reflection unit 732 executes a predetermined process described in the template when the matching unit 731 extracts the predetermined operation pattern described in the template from the history storage DB 740 or the history aggregate DB 741.

The communication controller 720 controls communication through the network I/F 207. The communication controller 720 includes a controller 721 which interprets the history data supplied from the multifunction peripheral 120 and a communication processor 722 which performs a communication process through the network I/F 207.

An activation unit 760 installs and enables (activates) the template. A system administrator operates the activation unit 760 so as to issue an instruction for storing a template in which an operation pattern of at least one of the multifunction peripherals 120 is associated with setting content for the multifunction peripheral 120 in the template DB 750. The activation unit 760 functions as an input unit which inputs the template.

The template may be edited or generated by an external apparatus, such as a PC. The edited or generated template is installed in the management server 110 through the activation unit 760 from the external apparatus. Alternatively, the multifunction peripheral 120 may perform editing and generation in response to an instruction issued by the external apparatus. Examples of the instruction for editing a template include an instruction for changing content of a description of a pattern field of the template stored in the template DB 750 and an instruction for changing content of a description of an action field.

The template is enabled when the activation unit 760 registers the template in the template DB 750. In this embodiment, the template may be generated in accordance with a predetermined format described below with reference to FIG. 7 by a system administrator or the like before being registered in the management server 110.

Next, a description of the template recorded in the template DB 750 will be described with reference to FIG. 7. In the example of FIG. 7, the template includes four items of a history type, a timing, a pattern, and an action.

In a history type (Kind) field of the template, information on the item of the history type is described. In the history type field, information indicating a type of history data of the template in a plurality of types of history data obtained from the multifunction peripheral 120 is described. Examples of the type of history data include an execution history of a print job, an execution history of a copy job, an execution history of a FAX job, and execution histories of all jobs. The examples of the type of history data further include a history of a user operation performed on the multifunction peripheral 120 and a history of an error which has occurred in the multifunction peripheral 120.

The matching unit 731 compares a type of the history data obtained from the multifunction peripheral 120 with a history type described in the history type field so as to select a template corresponding to the history data obtained from the multifunction peripheral 120. In this way, the matching unit 731 performs matching between the history data obtained from the multifunction peripheral 120 and the template.

In a timing (Timing) field, a designation of a timing when a predetermined process (an action) described in the selected template is executed is described.

For example, the history data is obtained from the multifunction peripheral 120, and information "Writing of history" may be described as information for an instruction for performing a predetermined action at the timing recorded in the history storage DB 740. Alternatively, information "Batch Process" for an instruction for performing the predetermined action at a predetermined time point may be described.

In a pattern (Pattern) field, a condition for executing the predetermined action described in the template is described. In the pattern field, content of an operation pattern of history data described in the history storage DB 740 and the aggregate data described in the history aggregate DB 741 is described. The operation pattern may indicate an operation performed by a single multifunction peripheral 120 or operations performed by a plurality of multifunction peripherals 120. Examples of the operation pattern of the plurality of multifunction peripherals 120 include a pattern of an operation of "performing a print process at least twice on a file of a name A by a user A using one of the plurality of multifunction peripherals 120 connected to the management server 110", for example. A case where the user A causes the multifunction peripheral 120*a* to execute a first print process on the file having the name A and causes the multifunction peripheral 120*b* to execute a second print process on the file having the name A corresponds to this operation pattern.

In an example of this embodiment, extraction of history data having specific content of a user name, a file name, a setting item, or a device ID of the multifunction peripheral 120 may be instructed in the pattern field. Furthermore, in the pattern field, extraction of a pattern from history data obtained before a predetermined period of time has elapsed after history data which satisfies a predetermined condition is obtained may be instructed. Moreover, the number of times the history data which satisfies the predetermined condition is processed may be specified in the pattern field.

For example, content "the user A instructs a print process on files of the same file name and the print process is executed twice or more in different settings within one minute" is described. The description in the pattern field corresponds to a query for detecting data constituting a specific pattern in the history data described in the history storage DB 740 and the aggregate data described in the history aggregate DB 741. When content of an action field described below corresponds to "history aggregate" indicating that data included in the history data is to be registered in the history aggregate DB 741, a pattern to be detected is not described in the pattern field.

In the action (Action) field, content of a process to be executed by the reflection unit 732 is described. In the example of FIG. 7, "setting reflection" or "history aggregate" is described. Here, "setting reflection" indicates update of setting content stored in the user setting DB 530, the common setting DB 521, or the individual setting DB 520. Furthermore, "history aggregate" indicates a process of registering history data obtained from the multifunction peripheral 120 in the history aggregate DB 741.

When "setting reflection" is described, a description for identifying a DB in which setting content thereof is to be updated among the user setting DB 530, the common setting DB 521, and the individual setting DB 520 is made. Furthermore, an instruction for specifying values (Value) of setting items (Key) in the DBs is described.

When "history aggregate" is described, aggregate is performed while a value of history data obtained from the multifunction peripheral 120 is associated with a column of the history aggregate DB 741. For example, information on the number of copies included in the history data is written in the history aggregate DB 741.

Next, a configuration of software executed by the multifunction peripheral 120 will be described with reference to FIG. 8. In this embodiment, the software of the multifunction peripheral 120 is stored in storage means, that is, one of the RAM 403, the HDD 404, and the ROM 402, and executed by the CPU 401.

A user setting DB 812 manages identification information of a user who logs in the multifunction peripheral 120 and setting information for each user which are associated with each other. A device setting DB 813 manages setting information set in a device irrespective of a user. A setting management unit 810 manages the user setting DB 812 and the device setting DB 813.

A history DB 822 stores a history of operations and processes executed in the multifunction peripheral 120. A history management unit 820 manages the history DB 822.

A synchronization processor 811 synchronizes the setting information stored in the user setting DB 812 and the device setting DB 813 with the master data of the setting management application 600. The setting data is transmitted through a communication processor 830.

A history controller 821 controls the communication processor 830 so that information stored in the history DB 822 is transmitted to the analysis application 700 of the management server 110.

A display controller 860 causes the operation unit 306 to display setting information and history data. An authentication unit 840 performs a login process for identifying a user.

Furthermore, the multifunction peripheral 120 includes a plurality of applications 850 which execute reading and writing of a setting through the setting management unit 810 and writing of history data on the history DB 822 through the history management unit 820. The applications 850 execute a copy process, a FAX process, and a print process, for example.

Next, an operation of a system according to this embodiment will be described with reference to FIGS. 9A to 9C. In FIG. 9A, a process executed by the analysis application 700 of the management server 110 is illustrated. In FIG. 9B, a process executed by the setting management application 600 of the management server 110 is illustrated. Furthermore, in FIG. 9C, a process executed by the multifunction peripheral 120 is illustrated. Flows in FIGS. 9A and 9B may be realized when the CPU 201 of the management server 110 develops programs stored in the HDD 204 or the like in a memory, such as the RAM 203, and executes the programs. A flow in FIG. 9C may be realized when the CPU 401 of the multifunction peripheral 120 develops programs stored in the HDD 404 or the like in a memory, such as the RAM 403, and executes the programs.

First, a process realized when the analysis application 700 in the management server 110 is executed will be described with reference to FIG. 9A.

First, the history management unit 710 obtains history data indicating an execution history of jobs from the multifunction peripheral 120 (S901). This embodiment includes various types of history data, such as a copy job execution history, a FAX job execution history, and a print job execution history. The history management unit 710 stores obtained history data in the history storage DB 740.

Subsequently, the matching unit 731 selects a template including a history type described therein corresponding to the job history (a history type) obtained in step S901 from among a plurality of templates stored in the template DB 750 (S902). The template selected in step S902 is used for a detection process to be executed in step S904 below.

In step S902, the matching unit 731 selects a template in which a history type corresponding to a type of the history data obtained in step S901 is described. For example, when history data indicating a copy job execution history is obtained in step S901, at least one template in which "copy" is described as a history type is selected from among the plurality of templates stored in the template DB 750. Then a process from step S903 to step S905 is executed on all selected templates.

In step S903, the matching unit 731 interprets content described in the pattern field of the template selected in step S902 (S903). Then it is determined whether a pattern of a history which matches the pattern described in the template is included in the history data recorded in the history storage DB 740 or the history data recorded in the history aggregate DB 741 (S904). In step S904, a process of detecting history data corresponding to an operation pattern described in the template from among the history data stored in the history storage DB 740 is performed.

A target for determining whether the history pattern which matches the pattern described in the template is the history data collected from the plurality of multifunction peripherals 120 connected to the management server 110. Alternatively, it may be determined whether the pattern described in the template is included only in history data of a specific one of the multifunction peripherals 120 (the multifunction peripheral 120*a*, for example) connected to the management server 110. Alternatively, it may be determined whether the pattern described in the template is included only in history data of any one of the multifunction peripherals 120 (the multifunction peripheral 120*a*, for example) connected to the management server 110. A condition for determining history data as the target of the pattern extraction may be described in the pattern field of the template. Content of a description of the pattern field in the template will be described in detail hereinafter with reference to FIGS. 10 to 12.

When the pattern described in the template is detected, the reflection unit 732 executes content described in the action field of the template. For example, when the content described in the action field indicates that a predetermined setting is to be reflected in the multifunction peripheral 120, the reflection unit 732 requests the setting management application 600 to execute a change of a setting of the multifunction peripheral 120 (S905). In this way, the reflection unit 732 performs update by detecting history data corresponding to the operation pattern described in the template from among the history data stored in the history storage DB 740 and reflecting the content of the setting associated with the operation pattern in the template to the master data.

Note that, although the case where the plurality of templates are successively processed in step S903 to step S905 of FIG. 9A is described as an example, processing tasks may be assigned to individual templates and processes may be performed in parallel on the plurality of templates.

Next, a process executed by the setting management application 600 which receives the request for changing the setting values of the multifunction peripheral 120 from the analysis application 700 will be described with reference to FIG. 9B.

The setting management unit 610 of the setting management application 600 determines databases to be updated based on content of the request transmitted from the analysis application 700. The databases to be updated is the user setting DB 530, the common setting DB 521, an individual setting DB 520*a*, and an individual setting DB 520*b* in the example of FIG. 5. Then the setting management unit 610 updates the determined databases (S911). In step S911, the update is performed in accordance with the content of the request transmitted from the analysis application 700.

The content updated in step S911 is transmitted to the multifunction peripheral 120 by the process in step S912 and step S913. Specifically, content of the master data is updated by reflecting content of the setting transmitted from the analysis application 700 to the master data. Then the setting management application 600 performs control such that update information indicating content of the update of the master data is output to the multifunction peripheral 120 in response to a request for obtaining update information supplied from the multifunction peripheral 120.

In step S912, an obtainment request transmitted from the multifunction peripheral 120 to the management server 110 is received by the communication controller 620. In this embodiment, the obtainment request is transmitted from the multifunction peripheral 120 to the management server 110 every predetermined period of time. Furthermore, in this embodiment, an obtainment request is transmitted from the multifunction peripheral 120 to the management server 110 at a timing when a predetermined event, such as a user login, occurs in the multifunction peripheral 120. The obtainment request includes time point information indicating a time point when preceding update information is received by the multifunction peripheral 120 from the management server 110.

In step S913, the communication controller 620 outputs the update information to the multifunction peripheral 120 which has transmitted the obtainment request. This update information includes content of update of the setting value updated by the setting management application 600 after the time point indicated by the time point information included in the obtainment request. The update information includes content of the update of the databases executed in step S911.

In this way, content of the update of the master data in the management server 110 may be reflected to at least one of the multifunction peripherals 120 connected to the management server 110. According to the process from step S901 to step S913, the following process is performed when history data corresponding to an operation pattern described in a template stored in the template management unit 730 is detected in history data stored in the history storage DB 740. Specifically, setting content (an action) which is associated with the operation pattern and which is described in the template is output to at least one of the multifunction peripherals 120.

Next, an operation of the multifunction peripheral 120 will be described with reference to FIG. 9C. A process from step S921 to step S923 is performed to transmit a job execution history of the multifunction peripheral 120 to the management server 110. Furthermore, in a process from step S924 to step S926, the content of update of the setting information in the management server 110 is obtained and is reflected in the multifunction peripheral 120.

In step S921, the multifunction peripheral 120 executes a print job, a copy job, a FAX job, or the like. The process in step S921 is executed by one of the applications 850 illustrated in FIG. 8.

In step S922, history data of the job executed in step S921 is recorded in the history DB 822. The recording of the history data is executed through the history management unit 820 by the application 850.

In step S923, the history data of the job executed in step S921 is transmitted to the analysis application 700 of the management server 110. The transmission of the history data is performed through the communication processor 830 under control of the history controller 821. In this way, the job execution history of the multifunction peripheral 120 is recorded in the history storage DB 740 of the management server 110.

In step S924, the multifunction peripheral 120 transmits a request for obtaining update information of setting information managed by the management server 110 to the management server 110. In this embodiment, the obtainment request is transmitted from the multifunction peripheral 120 to the management server 110 every predetermined period of time. Furthermore, in this embodiment, an obtainment request is transmitted from the multifunction peripheral 120 to the management server 110 at a timing when a predetermined event, such as a user login, occurs in the multifunction peripheral 120. As described above, the obtainment request includes time point information indicating a time point when the update information is received by the multifunction peripheral 120 from the preceding management server 110. The transmission of the obtainment request is realized under control of the synchronization processor 811.

In step S925, the update information is received from the management server 110. The update information includes update content of the setting information updated by the management server 110 after a time point indicated by the time point information included in the obtainment request transmitted in step S924.

In step S926, the update information received in step S925 is registered in the user setting DB 812 or the device setting DB 813. The registration of the update information is performed by the setting management unit 810. In this way, the operation of the multifunction peripheral 120 may be changed by changing the setting value of the multifunction peripheral 120.

According to the processes described with reference to of FIGS. 9A to 9C, when a job execution history of the multifunction peripheral 120 indicates a pattern described in a template registered in the management server 110, a change of predetermined setting information may be performed on the multifunction peripheral 120 in accordance with the pattern.

Next, examples of the templates will be described in detail with reference to FIGS. 10 to 12. This embodiment includes two types of template (first and second templates).

The first template is used to cause the reflection unit 732 to execute a predetermined process when history data obtained from the multifunction peripheral 120 is recorded in the history storage DB 740, and as a result, history data recorded in the history aggregate DB 741 or the history storage DB 740 has a specific pattern. The predetermined process is performed to reflect content of a predetermined setting associated with the detected specific pattern in the multifunction peripheral 120. The content of the predetermined setting associated with the detected specific pattern is to be set in at least one of the multifunction peripherals 120 connected to the management server 110 when the specific pattern is detected. The first template includes an instruction for executing a process of outputting content of a setting associated with a predetermined operation pattern to at least one of the multifunction peripherals 120 when history data corresponding to the predetermined operation pattern is detected in the history data stored in the history storage DB 740.

The second template is used to cause the history management unit 710 to execute a process of taking statistics of information included in the history data obtained from the multifunction peripheral 120. The second template includes an instruction for executing a process of reflecting content of history data to the history aggregate DB 741 when the history data is obtained.

The two types of template may be described in the same format illustrated with reference to FIG. 7. When a description "setting value reflection" is included in the action field, the first template described above functions. On the other hand, when a description "history aggregate" is included in the action field, the second template described above functions. In this embodiment, the second template information does not include information indicating an operation pattern. Specifically, when the description "history aggregate" is included in the action field, nothing is described in the pattern field.

The template may be described in a data description format, such as XML or JSON. Furthermore, a log pattern portion to be especially extracted may be described in a script language, such as JavaScript (registered trademark) or Ruby, instead of XML and JSON, or may be described in a format of SQL, for example. FIGS. 10 to 12 are diagrams illustrating examples of the template described in the JSON format.

The template of FIG. 10 is an example of the first template described above. In a field of a history type (Kind), a type of a target history is described. In the example of FIG. 10, the history type field indicates that the template is for a job history (JobLog). In particular, the history type field indicates that the template is associated with a job history of stored print (StoredPrint). Here, the stored print indicates a print process of storing print data input from a PC or the like to the multifunction peripheral 120 in the multifunction peripheral 120 without printing until user authentication is executed in the multifunction peripheral 120.

In the timing (Timing) field, information indicating that the process described in the action field is to be executed at a timing when history data is written in the history storage DB 740 (Every Write).

According to a description in the pattern (Pattern) field, the history data recorded in the history storage DB 740 (LogDB) selected from between the history storage DB 740 and the history aggregate DB 741 is a detection target of the predetermined pattern. In the pattern field, an instruction for detecting a plurality of history data which satisfy all conditions (1) to (5) below which are pattern conditions is described.

(1): User names included in the plurality of history data are the same.
(2): File names included in the plurality of history data are the same.
(3): Contents of NUP settings in the plurality of history data are different from one another.
(4) The plurality of history data which satisfy the conditions (1) to (3) are recorded in the history storage DB 740 within 300 seconds.
(5): A case which satisfies the conditions (1) to (4) exists at least five times.

Here, the NUP setting is a generic term of a so-called 2in1 setting, a so-called 4in1 setting, and the like and is performed for specifying printing of print data for N pages on one print sheet.

According to the action (Action) field, the template instructs an execution of "setting value reflection" (Settings Modify) selected between "setting value reflection" and "history aggregate". Furthermore, an instruction for updating the user setting DB 812 (UserDB) of the multifunction peripheral 120 is described. Moreover, according to the action field, the setting values are reflected in the setting item (Key) associated with a preview of the stored print in the user setting DB 812. Furthermore, according to the action field, a value (Value) is enabled (ON).

The template illustrated in FIG. 10 determines that a pattern in which the same user changes the NUP setting in the same file within 300 seconds after printing is performed once and performs printing as a stored job is an print error. A setting for performing a preview immediately before printing is activated for a user in which the pattern is detected 5 times or more. In this way, a setting for preventing a print error may be automatically performed for the user who often makes a print setting mistake.

The content of the template is not limited to this, and the system administrator may generate a template in accordance with a format of the template and register the template in the management server 110.

For example, in a case where the amount of print processing is likely to be increased in the last week every month, a template may be generated such that a print speed of the multifunction peripheral 120 is increased in the last week every months from a next month.

In this way, if it is likely that an amount of print processing of the multifunction peripheral is increased in a specific term, a printing speed higher than a normal speed is set in the multifunction peripheral in the specific term so that print jobs are prevented from being stuck in the multifunction peripheral. On the other hand, the normal print speed is set in the multifunction peripheral in a term other than the specific term so that power consumption and wear of the multifunction peripheral are reduced. In the specific term, a setting for displaying a notification "Do you want to change a print speed?" or the like may be enabled instead of an automatic change of the print speed.

The template of FIG. 11 is an example of the second template described above. A history type (Kind) field indicates a template is for a job history (JobLog). In particular, the history type field indicates that the template is associated with a job history of printing (Print).

According to a timing (Timing) field, a process described in an action field is executed is executed at a timing when history data is written in the history storage DB 740.

The pattern (Pattern) field is blank since the action field indicates "history aggregate" (Aggregate).

In the action (Action) field, an instruction for execution of "history aggregate" is described. Furthermore, an instruction for executing a process of adding the number of print outputs (Copies) included in the history data to a column called a total counter in the history aggregate DB 741 is described.

According to the template illustrated in FIG. 11, a process of adding the number of print outputs included in the history data to the column of the total counter in the history aggregate DB 741 every time history data of a print job is registered in the history storage DB 740 may be realized.

The reflection unit 732 may refer to a value calculated in the history aggregate DB 741 so as to execute an action described in the first template. In this way, an output total value may be obtained with reference to the history aggregate DB 741 without performing searching or counting on the history storage DB 740 every time an action is executed. Accordingly, a processing load for execution of an action is reduced. Furthermore, a speed of execution of an action may be improved.

The template described in FIG. 12 indicates execution of a process the same as a process described in the action field in the template of FIG. 11 as a batch (Bat) process. That is, a process of adding all records recorded in the history storage DB 740 after a preceding batch process to the column of the total counter in the history aggregate DB 741.

According to the embodiment described above, the user (the system administrator, for example) may store content of an arbitrary operation of the image forming apparatus and content of an arbitrary setting which are associated with each other in the system. Accordingly, the system may display content of the setting corresponding to an operation history of the image forming apparatus in addition to content of a setting set in the past in the image forming apparatus. Therefore, an appropriate setting may be suggested in accordance with an operation mode of the image forming apparatus.

Furthermore, according to this embodiment, an action to be executed may be determined taking execution histories of processes of the plurality of multifunction peripherals 120 connected to the management server 110 into consideration. Then the determined action may be reflected in all the plurality of multifunction peripherals 120.

Furthermore, an action to be executed may be determined, taking an execution history of a specific one of the multifunction peripherals 120 or an execution history of a process performed in accordance with a specific user operation into consideration, in the processes of the plurality of multifunction peripherals 120 connected to the management server 110. For example, information indicating that history data associated with the multifunction peripheral 120 associated with specific identification information or the user serves as a target of pattern extraction is described in the pattern field of the template.

Note that all history data obtained by the management server 110 from the multifunction peripheral 120 may not be stored in the history storage DB 740 but history data associated with some of history items included in the obtained history data may be extracted and stored in the history storage DB 740. Hereinafter, a case where content of the history data to be stored in the history storage DB 740 is filtered will be described as an example.

Figure 13:
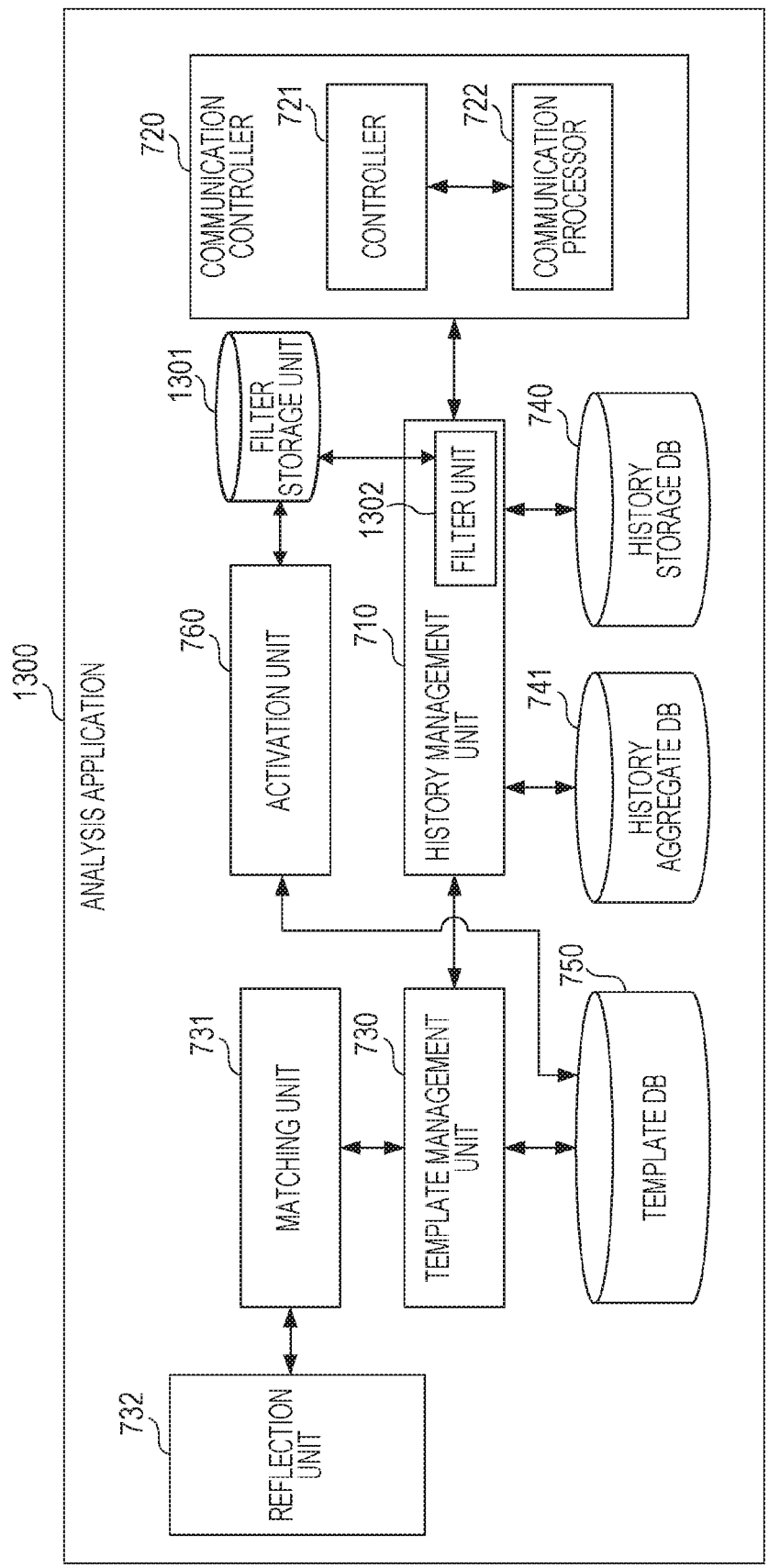
FIG. 13 is a diagram illustrating a software configuration of an analysis application 1300.

A configuration of an analysis application 1300 used to perform filtering on content of history data will be described with reference to FIG. 13.

The analysis application 1300 includes a filter storage unit 1301. The filter storage unit 1301 stores filter information for specifying a data item (a history item) to be stored in the history storage DB 740 in history data to be stored in the history storage DB 740. The filter information may be stored in a file format. The user, such as the system administrator, may store a file of filter information generated in the external apparatus, such as a PC, in the filter storage unit 1301 through the activation unit 760. Furthermore, content of file data stored in the filter storage unit 1301 may be changed by the external apparatus, such as a PC.

The file data includes an instruction for recording only a processing execution time point, identification information of a user who instructs execution of the process, and a history type included in the history data obtained from the multifunction peripheral 120 in the history storage DB 740.

A filter unit 1302 determines data items to be stored in the history storage DB 740 in the history data obtained by the communication controller 720 from the multifunction peripheral 120 with reference to filter information stored in the filter storage unit 1301. The filter unit 1302 stores only the determined data items in the history storage DB 740. The filter unit 1302 extracts history data associated with predetermined history items in the obtained history data and stores the extracted history data in the history storage DB 740.

By this, only information required for detection of a pattern described in the template is recorded in the history storage DB 740. The administrator may flexibly change data items of the history data to be recorded in the history storage DB 740 in accordance with content of the executed template.

Furthermore, not only the data items to be stored in the history storage DB 740 but also files for instructing storage of only history data having specific values in the history storage DB 740 may be registered in the filter storage unit 1301. For example, in the history data obtained from the multifunction peripheral 120, filter information indicating that only history data obtained when the multifunction peripheral 120 is operated while the user A is in an login state is stored in the history storage DB 740 may be stored in the filter storage unit 1301 in the history data obtained from the multifunction peripheral 120. If a description of the template indicates extraction of a specific pattern in the history data obtained when the user A operates the multifunction peripheral 120 while being in the login state, history data of operations of users other than the user A is not required. When such filter information is registered, only information required for detection of a pattern described in the template is recorded in the history storage DB 740. Furthermore, an amount of history data to be matched is reduced when the matching between the template and the history data is performed, and therefore, a matching speed may be improved.

Furthermore, as illustrated in FIG. 14A, identification information of the template may be associated with filter information and stored in the filter storage unit 1301. Then only when the template associated with the filter information is enabled, a filter process may be performed using the filter information.

The activation unit 760 may perform switching between enabling and disabling on a plurality of templates recorded in the template DB 750. The term "Enabling of the template" indicates use of the template in the matching process performed by the matching unit 731. On the other hand, the term "Disabling of the template" indicates that the template is not used in the matching process performed by the matching unit 731.

The activation unit 760 manages information indicating enabling or disabling on the plurality of templates recorded in the template DB 750 as illustrated in FIG. 14B. The activation unit 760 manages information indicating enabling or disabling on the plurality of filter information stored in the filter storage unit 1301 as illustrated in FIG. 14C.

The enabling and the disabling of a template may be set by the system administrator. The activation unit 760 manages the filter information associated with the template which is enabled as enabling filter information.

By this, a filter to be employed may be automatically switched depending on a type of an applied template. By changing a filter to be employed, content of history data stored in the history storage DB 740 may match the employed template.

Furthermore, the filter information may be automatically generated based on the content of the template stored in the template DB 750. The generation unit not illustrated may determine data items of required history data based on the description in the pattern field or the action field of the template and generate filter information for storing the determined items in the history storage DB 740. The generated filter information is registered in the filter storage unit 1301. Also in this way, history data corresponding to the template may be recorded in the history storage DB 740.

For example, when the description in the action field of the template is "history aggregate", filter information may be generated such that only data items of aggregate targets (for example, the number of copies) are registered in the history storage DB 740. Furthermore, if the description in the pattern field of the template indicates conditions using a user name, a file name, and a setting type, the filter information may be generated such that the data items are registered in the history storage DB 740.

When a plurality of templates are to be employed, data items used in the individual templates are determined, and filter information is generated such that a data item group which includes all the data items determined to be used is registered in the history storage DB 740.

In this embodiment, the history data to be registered in the history storage DB 740 is filtered using the filter information, and therefore, a storage capacity of the history storage DB 740 may be efficiently used. Furthermore, since only the history data required for the template matching process is stored in the history storage DB 740, an amount of history data to be subjected to the matching may be reduced, a processing load of the matching may be reduced, and a matching speed may be improved.

OTHER EMBODIMENTS

The present invention may be realized when a program which realizes at least one of the functions in the foregoing embodiment is supplied to a system or an apparatus through a network or a storage medium and at least one processor included in a computer of the system or the apparatus reads and executes the program. Furthermore, the present invention may be realized by a circuit (an ASIC, for example) which realizes at least one of the functions.

The present invention is not limited to the foregoing embodiment and various modifications and changes may be made without departing from the spirit and the scope of the present invention. Accordingly, claims below are attached to disclose the scope of the present invention.

With this configuration, a user (a system administrator, for example) may store arbitrary operation content and arbitrary setting content of an image forming apparatus which are associated with each other in a system. Accordingly, the system may suggest, in addition to setting content set in the image forming apparatus in the past, setting content corresponding to an operation history of the image forming apparatus. In this way, the system of the present invention may suggest an appropriate setting corresponding to an operation mode of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus communicating with a first image forming apparatus and a second image forming apparatus, the information processing apparatus comprising:
a storage device that stores an operation pattern and setting content which are associated with each other;
at least one memory device that stores a set of instructions; and
at least one processor that executes the instructions to:
obtain, from the first image forming apparatus, history data including one or more operation histories of the first image forming apparatus;
accumulate the obtained history data; and
in a case where operation histories corresponding to the operation pattern stored in the storage device is detected in the accumulated history data, output, to a setting management application server, the setting content stored in the storage device and associated with the operation pattern,
wherein the setting management application server is configured to output the setting content to the first image forming apparatus in response to a request from the first image forming apparatus, and
wherein the setting management application server is further configured to output the same setting content to the second image forming apparatus in response to a request from the second image forming apparatus.

2. The information processing apparatus according to claim 1,
wherein the storage device stores the operation pattern and the setting content as template information describing a history type and an association of the operation pattern and the setting content, and
wherein in a case where one or more operation histories corresponding to the operation pattern described in the template information in which a history type of the accumulated history data is described is detected in the accumulated history data, the setting content described in the template information is outputted to the setting management application server.

3. The information processing apparatus according to claim 1, wherein the at least one processor executes instructions in the memory device to:
receive an instruction for changing the stored operation pattern or for changing the setting content to be associated with the operation pattern.

4. The information processing apparatus according to claim 1, wherein the accumulated history data is history data extracted associated with a predetermined history item in the obtained history data.

5. A method for an information processing apparatus communicating with a first image forming apparatus and a second image forming apparatus, the information processing apparatus including a storage device that stores an operation pattern of an image forming apparatus and setting content set in the image forming apparatus which are associated with each other, the method comprising:
obtaining, from the image forming apparatus, history data including one or more operation histories of the first image forming apparatus;
accumulating the obtained history data; and
in a case where operation histories corresponding to the operation pattern stored in the storage device is detected in the accumulated history, outputting, to a setting management application server, the setting content stored in the storage device and associated with the operation pattern,
wherein the setting management application server is configured to output the setting content to the first image forming apparatus in response to a request from the first image forming apparatus, and
wherein the setting management application server is further configured to output the same setting content to the second image forming apparatus in response to a request from the second image forming apparatus.

6. The method according to claim 5, wherein the storage device stores the operation pattern and the setting content as template information describing a history type and an association, the operation pattern and the setting content, and
wherein in a case where one or more operation histories corresponding to the operation pattern described in the template information in which a history type of the accumulated history data is described is detected in the accumulated history data, outputting to the setting management application server, the setting content described in the template information.

7. The method according to claim 5, further comprising receiving an instruction for changing the stored operation pattern or for changing the setting content to be associated with the operation pattern.

8. The method according to claim 5, wherein the accumulated history data is history data extracted associated with a predetermined history item in the obtained history data.

9. A non-transitory computer-readable storage medium having stored therein a program for causing a computer to implement a method for an information processing apparatus communicating with a first image forming apparatus and a second image forming apparatus, the information processing apparatus including a storage device that stores an operation pattern of an image forming apparatus and setting content set in the image forming apparatus which are associated with each, the method comprising:
obtaining, from the image forming apparatus, history data including one or more operation histories of the first image forming apparatus;
accumulating the obtained history data; and
in a case where operation histories corresponding to the operation pattern stored in the storage device is detected in the accumulated history, outputting, to a setting management application server, the setting content stored in the storage device and associated with the operation pattern, wherein the setting management application server is configured to output the setting content to the first image forming apparatus in response to a request from the first image forming apparatus, and wherein the setting management application server is further configured to output the same setting content to the second image forming apparatus in response to a request from the second image forming apparatus.

\* \* \* \* \*